April 28, 1942.  E. BERTALAN ET AL  2,281,190
METHOD OF AND APPARATUS FOR ASSEMBLING ARTICLES
Filed June 5, 1940  2 Sheets-Sheet 1

INVENTORS
E. BERTALAN
L. J. MOELLER
BY
E.R. Nowlan
ATTORNEY

April 28, 1942. E. BERTALAN ET AL 2,281,190
METHOD OF AND APPARATUS FOR ASSEMBLING ARTICLES
Filed June 5, 1940 2 Sheets-Sheet 2
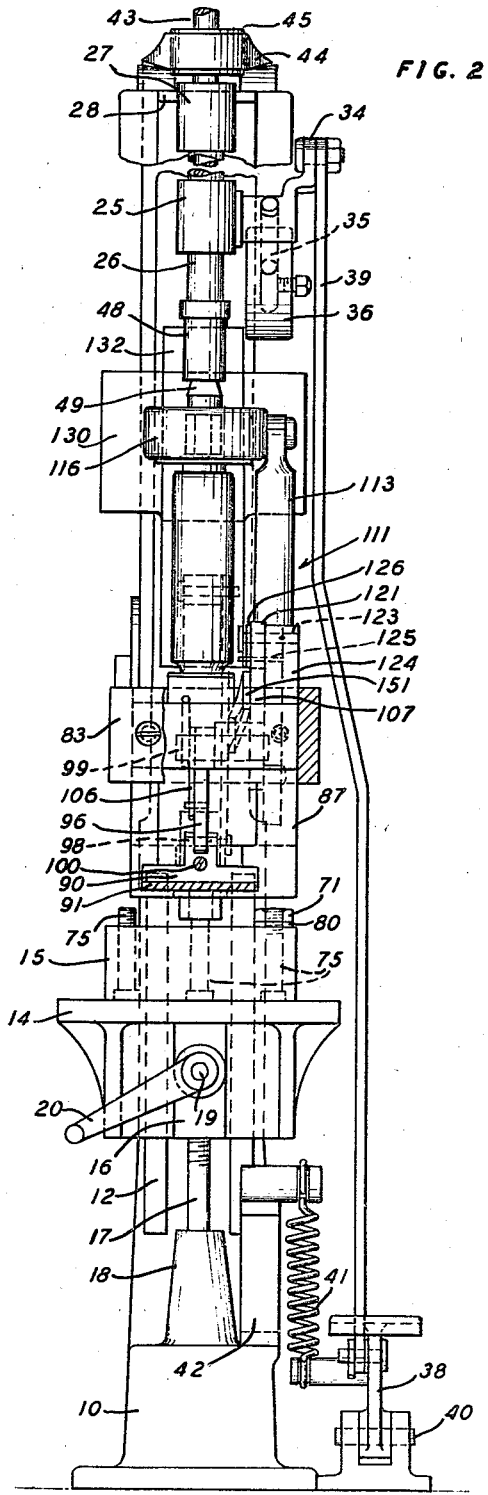
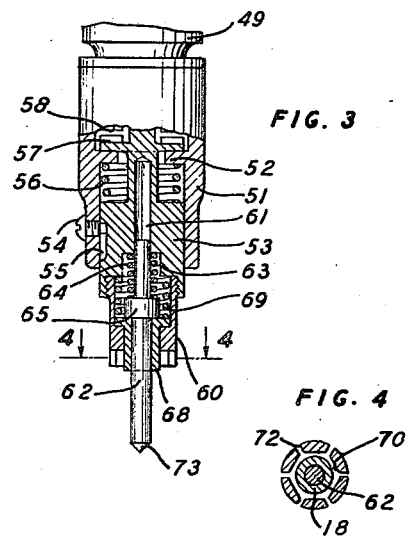
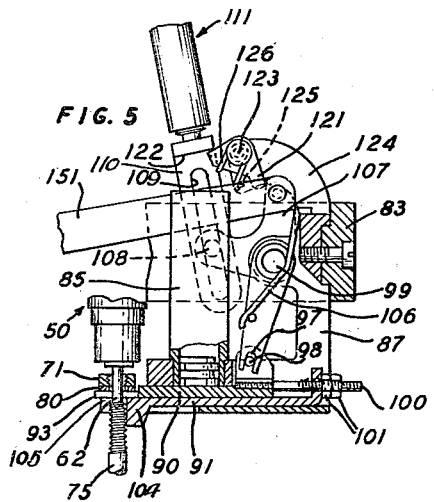
INVENTORS
E. BERTALAN
L. J. MOELLER
BY
E. R. Nowlan
ATTORNEY Patented Apr. 28, 1942

2,281,190

UNITED STATES PATENT OFFICE 2,281,190

METHOD OF AND APPARATUS FOR ASSEMBLING ARTICLES

Edward Bertalan, Glen Arm, and Lowell J. Moeller, Towson, Md., assignors to Western Electric Company, Incorporated, New York, N. Y., a corporation of New York Application June 5, 1940, Serial No. 338,880

32 Claims. (Cl. 10—155)

This invention relates to a method of and apparatus for assembling articles, and more particularly to a method of and apparatus for assembling nuts and washers on bolts.

Certain requirements are felt important in automatically assembling internally threaded articles such as nuts on externally threaded articles such as bolts, these requirements being, first, the centering of the articles one with the other, second, maintaining of this relationship of the articles during relative movement thereof into engagement with each other, and finally, aligning of the axes of the parts before they can properly be assembled. Other requirements are added to these when it is desirable to include another article in the assembly such as a washer. These requirements include movement of the nut and washer in timed relation into superposed relationship, holding them thus during the centering step and releasing them simultaneously for alignment with the bolt.

Objects of the invention are to provide a simple, efficient and practical method of and apparatus for assembling articles, particularly nuts and washers, on bolts.

With this and other objects in view, one embodiment of the invention comprises a method of feeding articles, such as nuts and washers, from opposite directions into superposed relationship over another article, such as a bolt, passing a guide through the first mentioned articles to guide them into engagement with the remaining article and causing relative rotation of the articles to cause assembling thereof.

The apparatus by means of which the method may be practised comprises a reciprocable element, such as a rotatable wrench, operatively connected to article feeding units to feed articles, such as nuts and washers, in timed relation with respect to each other into superposed positions over another article such as a bolt, and a centering member movable with the element to center the first mentioned articles with the remaining article prior to the engagement of the element to cause relative rotation of the articles and thus cause assembling thereof.

Other objects and advantages will be apparent from the following detailed description when taken in conjunction with the accompanying drawings, wherein Fig. 1 is a fragmentary side elevational view of the apparatus, portions thereof being shown in section;

Fig. 2 is a vertical elevational view of the apparatus, portions thereof being shown in section;

Fig. 3 is an enlarged fragmentary sectional view of the rotary element or wrench;

Fig. 4 is a horizontal sectional view taken along the line 4—4 of Fig. 3, and

Fig. 5 is a fragmentary sectional view illustrating the latched position of a portion of the article feeding means.

Figure 1:
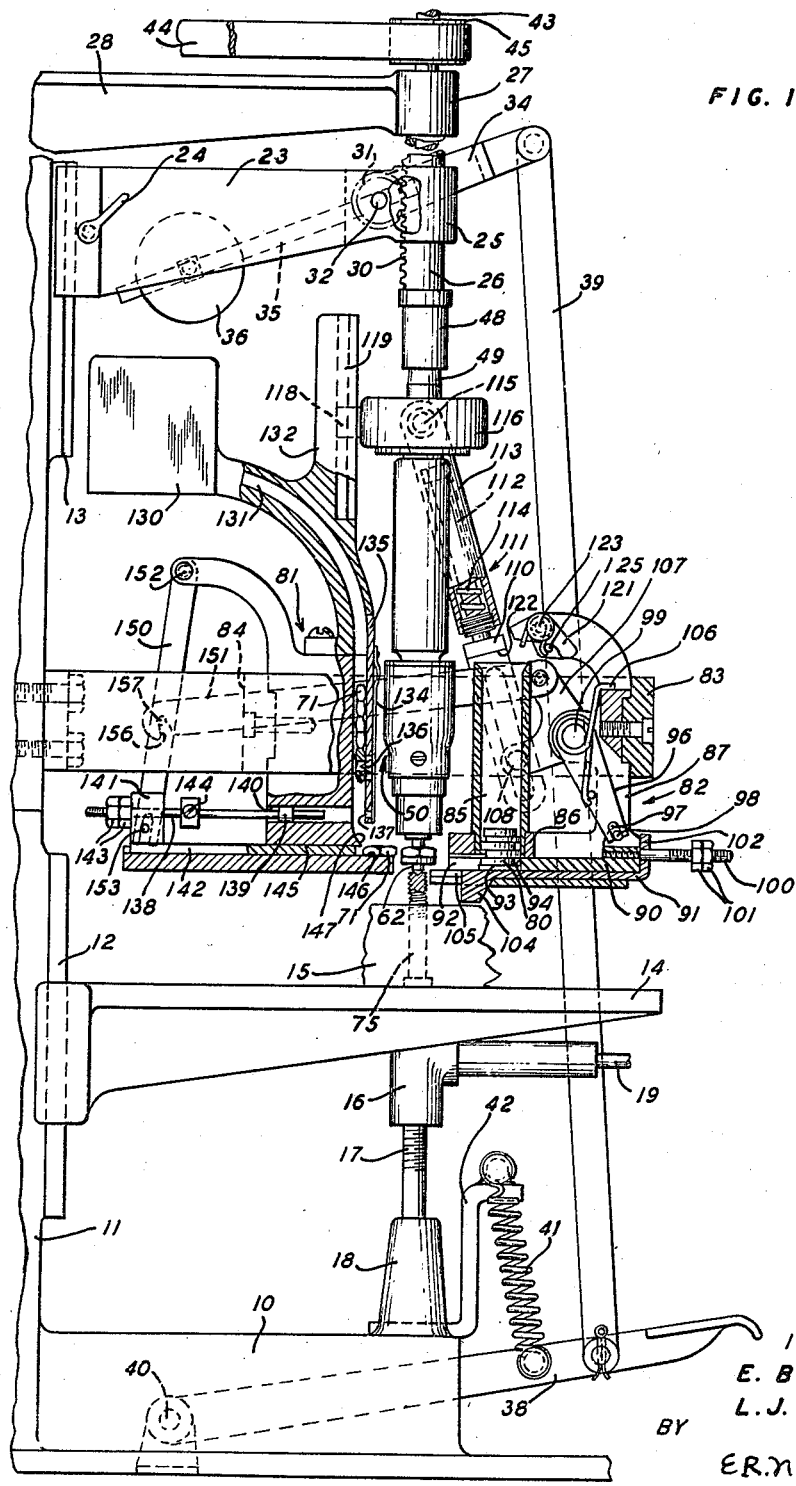

Referring now to the drawings, particularly Figs. 1 and 2, the apparatus comprises a base 10 and a vertical frame 11 having guideways 12 and 13 thereon. Guideway 12 provides a support for a table 14 upon which work such as that indicated at 15 may be disposed. An adjustable support 16 is also provided for the table 14 and consists mainly of an adjusting screw 17 rotatably supported by the base 10 at 18 and actuated through a nut (not shown) and shaft 19 by the aid of a handle 20.

The upper guideway 13 supports a laterally projecting bracket 23, the latter being adjustably secured in a selected position on the guideway by suitable means indicated at 24. The bracket 23 has a suitable bearing 25 at the upper end thereof for slidably supporting a quill 26, the latter being also slidably supported in a bearing 27 of a bracket 28 formed integral with the frame 11. Teeth 30 formed on the quill 26 interengage a pinion 31 mounted on a shaft 32 rotatably supported by the bracket 23. A lever 34 has its inner end fixed to the shaft 32 and carries an arm 35 upon which a weight 36 is mounted in any desired adjusted position. The outer end of the lever 34 is connected to a foot treadle 38 by means of a link 39. The foot treadle 38 is pivotably supported at 40 and is normally urged upwardly by the weight 36, the lever 34 and the link 39 and also by a spring 41, one end of which is fixed to the treadle while the other is fixed to a bracket 42 mounted on the base 10.

The quill 26 is hollow and has a spindle 43 extending therethrough and rotated by suitable power means including a belt 44 and a pulley 45. A chuck 48 is mounted upon the lower end of the spindle and is of a suitable type conditioned to receive and hold a shank 49 of an element such as a wrench 50.

The wrench is shown in detail in Fig. 3 and consists of a housing 51 rotatably supported at the lower end of the shank 49, and has an inwardly projecting annular shelf 52 for supporting a clutch member 53. The clutch member is held against rotation relative to the housing 51 by a screw 54 carried by the housing and having a reduced end extending into an elongate slot 55 in the clutch member. A compression spring 56 disposed between the shelf 52 and the clutch member 53 normally urges the latter downwardly to move teeth 57 of the clutch member out of engagement with teeth 58 carried by the shank 49. With this construction the wrench may be caused to rotate with the shank when the teeth 57 and 58 are interengaged. The clutch member 53 has a head 60 of the wrench threadedly connected to the lower end thereof and is recessed at 61 to receive an inner projection of a centering member or pin 62 and at 63 to receive a compression spring 64 which abuts against a shoulder 65 of the centering pin to normally urge the latter downwardly. The centering pin extends through an aligning member 68 which is slidably disposed in the head and normally urged downwardly by a spring 69 in a path always centered with the centering pin and the wrench. The head 60 is recessed, at 70, to receive a nut such as those indicated at 71 (Figs. 1 and 5), with radially projecting notches 72 for readily receiving the edges of the nuts. The lower end of the guide pin is conical in shape, as indicated at 73, and conditioned to be received in a conical recess in the end of an article such as a bolt 75 shown in Fig. 1.

The wrench 50 may be moved toward or away from the article, namely the bolt 75 carried by the work 15, through the actuation of the treadle 38. Means are provided to feed the nuts 71 and washers 80 singly and in timed relation into superposed positions during the upward movement of the wrench so as to be positioned for assembling on a bolt when the wrench is moved downwardly. Therefore, a nut feeding unit, indicated generally at 81, and a washer feeding unit, indicated generally at 82, are supported by a U-shaped bracket 83 and a cross-member 84 mounted upon and extending horizontally from the frame 11.

The washer feeding unit 82 includes a hopper 85 for the washers supported by a base portion 86 of an L-shaped bracket 87, the latter being mounted upon the main bracket 83. Two slide members 90 and 91 are disposed in superposed positions on the base portion 86 and guided in their movements by an aperture 92 in the base portion into which they extend. The slide 90 has a notched forward portion 93 positioned beneath the stack of washers in the hopper and providing a shoulder 94 conditioned to engage the lowermost washer and remove it from beneath the stack when the slide 90 is moved toward the aligning position. The notch in the portion 93 is of sufficient size to straddle the centering pin 62. The outer portion of the slide 90 is notched to receive the lower end of an arm 96, the latter also being provided with a notch 97 which straddles a pin 98 in the said outer portion to cause movement of the slide 90 when the arm is rotated about its supporting shaft 99. The outer end of the slide 90 also carries a threaded member 100 supporting a pair of stop nuts 101 for engagement with a vertically projecting portion 102 of the slide 91 apertured for the passage of the threaded member 100 therethrough. The inner end of the slide 91 is enlarged, as at 104, and notched, at 105, to straddle the bolt 75 and serve to locate the bolt in alignment with the centering pin 62. A spring 106 is mounted upon the shaft 99 and conditioned to urge the shaft, through the arm 96, counterclockwise (Fig. 1). A bellcrank lever 107 is also mounted upon the shaft 99 and moved therewith. One end of the lever 107 carries a pin 108 to provide operative connection between the lever and an elongate slot 109 of the lower end 110 of a link 111. This portion of the link carries a rod 112 which projects upwardly into a hollow upper portion 113, where the rod is urged inwardly by a spring 114. The link, therefore, is expansible and has its upper end pivotably connected, at 115, to the outer shell of a bearing 116. The bearing 116 is mounted upon the shank 49, providing an inner race which may rotate with the shank and an outer race or shell supporting the link 111, the outer shell being held against rotation by an integral lug 118 slidably disposed in a guideway 119.

Returning to the bellcrank lever 107, attention is directed to Figs. 1 and 5, wherein the inner edge of the upper arm of this lever is flattened for engagement with a latch 121 conditioned to hold the operating members of each of the units 81 and 82 in operative positions until the wrench is lowered and the ejected nut and washer aligned with the bolt. The latch 121 is somewhat of the bellcrank lever type, having one projection positioned to be engaged by the bellcrank lever 107 and another projection conditioned to be engaged by a shoulder or projection 122 of the lower portion 110 of the link 111. The latch 121 is pivotally supported, at 123, upon an arm 124 mounted upon the bracket 83 and is urged clockwise against a pin 125 by a spring 126.

The unit 81 includes a hopper 130 for the nuts 71, the hopper communicating with a passageway or chute 131 where the nuts will pass sidewise downwardly, as illustrated in Fig. 1. The portion of the hopper including the passageway also has an integral projection 132 including the guideway 119. A resilient retaining member 134 is mounted upon a plate 135, forming a wall of part of the passageway 131, and has a conical-shaped retaining member 136 conditioned to project through an aperture in the plate 135 and successively enter the threaded aperture of the nuts as they move downwardly in the passageway. An aperture 137 is also formed in the plate 135 adjacent the lower end thereof and in alignment with an actuating rod 138 conditioned to project its forward end through the aperture 137 and move the resilient member 134 a sufficient distance to remove the conical-shaped retaining member 136 from the nut in which it is disposed.

The rod 138 has a piston-like portion 139 slidably disposed in a cylindrical aperture 140, while the inner end, that is, the end to the left (Fig. 1), projects through a vertical portion 141 of a feeding slide 142 and is then provided with adjusting nuts 143 which control the movement of the rod in one direction. A collar 144 mounted upon the rod 138 and adjustably secured thereto is positioned to be engaged by the projection 141 of the slide after the slide has been moved a selected distance.

The slide 142 is guided by a groove 145, the lower wall of which projects inwardly to provide a support 146 for an ejected nut. A curved surface 147 at the lower end of the passageway 131 provides means for turning the nut from the endwise or vertical position in the passageway to the horizontal position on the support 146. The slide 142 is operatively connected to the upper arm of the bellcrank lever by a pair of links 150 and 151, the former being pivotably supported at 152 and having its lower end notched to engage a pin 153 carried by the portion 141 of the slide 142, while the link 151 has one end connected to the bellcrank lever 107 and the other end formed into a hook, as at 156, to engage a pin 157 mounted substantially midway the ends of the link 150.

In the operation of the apparatus the hoppers 85 and 130 are kept filled with washers and nuts respectively, so that they may be fed singly from their respective hoppers into superposed positions and be aligned with bolt 75 of work 15 disposed upon the table 14.

The apparatus as shown in Fig. 1 illustrates the position of the various elements at the point when the centering pin 62 has become seated in the conical end of the bolt and the latch 121 has been released to allow the spring 106 to move the slides 90 and 91 to the right free of the washer and nut, which at this point are disposed concentric with the locating pin. The washer and nut are shown in the positions in which they were disposed by their respective slides for the purpose of illustration, but in actual practise when the slides are retracted the washer will drop around the bolt and the nut will drop until it rests on the bolt. This portion of the operation has been accomplished by partial downward movement of the treadle 38 against the force of the spring 41 and the weight 36 to move the link 39 downwardly, rocking the lever 34 to cause the pinion 31 and its engagement with the teeth 30 to move the quill 26 downwardly, moving with it the spindle 43, the chuck 48, the shank 49 and the bearing 116 relative to the guideway 119, thus moving the wrench 50 and the locating pin 62 downwardly. By further movement of the treadle downwardly the wrench will be lowered, causing the aligning member 68 to engage the nut, which at this time rests upon the bolt. The aligning member 68 will cause the nut to lay on the bolt in a plane at right angles to the center line of the bolt and will hold the nut thus until the wrench is lowered further, to cause the nut to be received in the recess 70 of the head 60. Therefore, as the wrench is lowered over the nut the spring 69 is compressed to allow continued downward movement of the wrench, while at the same time the spring 64 around the centering pin 62 is also compressed. The treadle 38 is moved still further to compress the spring 56 and cause interengagement of the clutch teeth 57 and 58 to operatively connect the wrench with the continuously rotating shank 49. The nut is then driven onto the bolt, after which the treadle is released and allowed to move upwardly.

During the upward movement of the treadle the spring 41 aided by the weight 36 will cause the quill 26 with the chuck 48, the shank 49, the wrench 50 and the other associated elements to move upwardly. This upward movement of the mechanism just described causes upward movement of the expansible link 111 which at a predetermined point during this upward movement starts clockwise movement of the lever 107 against the force of its spring 106, to first cause movement of the slide 90 to eject the next washer from the hopper and move this washer on the notched forward portion 93 of the slide to the left, until the washer is centrally aligned with the centering pin 62. The nuts 101 on the threaded member 100 carried by the slide 90 engage the vertical projection of the slide 91 and cause movement of the latter with the slide 90 to the locating position. While in this position the notched end 105 of the slide 91 is of such a size and contour at its inner end to serve as a guiding means for the bolt 75 and is of sufficient width at its outer end to allow the nut and washer to be assembled on the bolt when the slides 90 and 91 have been returned to their loading positions.

Attention is now directed to the feeding unit 81 which during the previous operation has located a nut 71 on the support 146 in front of the slide 142. As will be observed by viewing Fig. 1, the portion 93, which supports the washer, locates the upper surface of the washer in a plane with the support 146 so that the nut 71, which is moved into place on the washer subsequent to the locating of the washer, will also be supported by the portion 93 of the slide 90. The connecting mechanism of the two units 81 and 82 are such that they will be operated in timed relation, first positioning the washer in central alignment with the centering pin 62, moving the slide 91 to locate a bolt in alignment with the centering pin and immediately thereafter moving the nut upon the located washer, the latter movement being accomplished through the link 151 which is moved through the lever 107 and moves the link 150 to move the slide 142. The slide 142 is of sufficient length to move the nut into an axially aligned position upon the washer. During this movement of the slide 142 the vertical portion 141 thereof will engage the collar 144, moving the rod 138 forwardly while guided by the piston-like portion 139 until the forward end of the rod passes through the aperture 137 and moves the resilient retaining member 134 to the right a sufficient distance to withdraw the conical-shaped retaining member 136 free of the nut into which it has projected, allowing this nut together with all the others above it in the chute to move downwardly a distance equalling the width of one nut. The nuts in the chute then rest upon the rod 138 for the completion of the upward movement of the wrench 50 and the associated mechanism and until the wrench is moved downwardly to the position shown in Fig. 1. The slides 90, 91 and 142 also remain in their inward or locating positions due to the fact that when they reach these positions the lever 107 has been moved a sufficient distance, as shown in Fig. 5, to be held by the latch 121. Therefore, during the upward movement of the wrench and its associated elements including the treadle 38 the feeding units 81 and 82 have been operated and latched in positions holding a nut and washer ready to be assembled on a bolt when the operator is desirous of starting another cycle of operation.

In moving the treadle 38 downwardly, the centering pin 62 passes through the located nut and washer and reaches the bolt so as to provide a positive centering means for the nut and washer before they are released by the portion 93 of the slide 90. The moment the centering pin 62 reaches the bolt 75 the projection 122 on the lower portion 110 of the link has been moved into engagement with the latch 121 to release the latch as the centering pin engages the bolt to allow the spring 106 to return the feeding members, such as the slides 90, 91 and 142, to their normal positions, freeing the nut and washer for assembly on the bolt. When the washer and nuts are freed the washer will drop around the bolt while the nut will drop on the bolt and be held there by the centering pin 62. The continued movement of the treadle causes the aligning member 68 to axially align the nut relative to the bolt by positioning it in a plane at right angles to the center line of the bolt, so that the wrench may readily engage the bolt and more important, so that the nut will be in proper position to be readily threaded onto the bolt when the clutch members 57 and 58 operatively connect the wrench to the driving means to drive the nut onto the bolt.

Returning for the moment to the releasing of the lever 107, through the actuation of the latch 121, by engagement of the link 111, attention is directed to the difference in location of the pin 108 which controls the path of movement of the link in the normal position shown in Fig. 1 and the operated position shown in Fig. 5. In Fig. 1 the pin 108 is so located that the link may be moved upwardly free of engagement with the latch but during this upward movement the pin is moved with the lever 107 to the latch position (Fig. 5). Therefore, the pin 108 in the latch position directs the link 111, when moving downwardly, to move in a path so that the projection 122 of the lower portion 110 of the link will engage and release the latch 121. At this time attention is directed to the rod 138 which was caused to move to the left a short time interval after the slides 90, 91 and 142 began their movements toward their outward or loading positions. The nuts 143 are located so that, after the located nut and washer have been fed to and received by the locating pin, the nut which has previously been released from the conical retaining member 136 will be freed from its support on the rod 138 and allowed to drop downwardly on the support 146, engaging the curved surface on its way and being turned to its horizontal position. It should be understood at this point that before the rod 138 has been withdrawn completely from the nut resting thereupon the conical retaining member 136 has entered the nut immediately thereabove to hold this nut and the others in the chute above it against movement.

When the apparatus is at rest, that is, when the treadle 38 has been released and moved to its uppermost position, the slides 90, 91 and 142 have been moved to their innermost or locating positions and held there by the latch 121, the slide 90 has located its washer in alignment with the centering pin 62 and has received the nut from the support 146 on and concentrically with the washer through the subsequent movement of the slide 142. The slide 91 has been moved to a position to locate a bolt in alignment with the centering pin, and this slide, together with the others remains latched in this position ready for the assembling operation.

During the assembling operation, which is brought about by the downward movement of the treadle, the centering pin 62 passes through the nut and washer and becomes seated on the bolt before the latch 121 is released. The washer then drops downwardly, guided by the centering pin, around the bolt, and the nut comes to rest on the bolt, where it remains centered by the centering pin. By the term "centered" which applies to the function of the centering pin 62, it is meant that the pin maintains the center line of the nut at the center line of the bolt. However, in order that the nut and washer may move freely on the centering pin this pin is made smaller in diameter than the inner diameter of either the nut or washer, and although the centering pin will maintain the center line of the nut at the center line of the bolt when in the position shown in Fig. 1, it may be possible for the nut to be out of true axial or center alignment with the bolt. The aligning member 68, however, engages the nut prior to the completion of the movement of the wrench into the assembling position, so as to definitely align the centers of the nut and bolt so that the nut may be readily received in the recess 70 of the wrench and will be positioned to be driven on the bolt. The provision of the notches 72 serves to facilitate in the interengagement of the nut and wrench, these notches receiving the sharp edges of the nut which would tend to interfere with the interengagement of the nut and wrench if the notches were not present.

The embodiment of the invention herein disclosed is illustrative only and may be widely modified and departed from in many ways without departing from the spirit and scope of the invention as pointed out in and limited solely by the appended claims.

What is claimed is:

1. An apparatus for assembling articles such as nuts and washers on bolts comprising means to move a nut and a washer into superposed positions, means to center the nut and washer with a bolt, and means operable in timed relation with the said moving and centering means to assemble the nut and washer on the bolt.

2. An apparatus for assembling articles such as nuts and washers on bolts comprising means to move a nut and a washer into superposed positions, means to align the nut with a bolt, and means operable in timed relation with the moving and aligning means to assemble the nut and washer on the bolt.

3. An apparatus for assembling articles such as nuts and washers on bolts comprising means to position a bolt for assembly, means to position a washer in alignment with the bolt, means to position a nut on the washer, and means operable in timed relation with the other means to assemble the nut and washer on the bolt.

4. An apparatus for assembling articles such as nuts and washers on bolts comprising a reciprocable assembling element, means to reciprocate the element, and separate means operable in timed relation with each other and the element to locate a nut, a washer and a bolt in alignment with each other and the element for assembly by the element.

5. An apparatus for assembling articles such as nuts and bolts comprising a rotatable wrench, means to move the wrench into and out of assembling position, separate means operable in timed relation with the movement of the wrench to locate a nut and washer for assembly, and means actuable in timed relation with the locating means to center the nut and the bolt one with the other prior to the movement of the wrench into assembling position.

6. An apparatus for assembling articles such as nuts and bolts comprising a rotatable wrench, means to move the wrench into and out of assembling position, separate means operable in timed relation with the movement of the wrench to locate a nut and washer for assembly, means to center the nut and bolt, and means operable in timed relation with the locating means to align the centers of the nut and bolt prior to the movement of the wrench into assembling position.

7. An apparatus for assembling articles such as nuts and washers on bolts comprising a rotatable wrench, means to move the wrench into and out of assembling position, means to locate a nut in general alignment with a bolt, means to locate a washer for receiving and supporting the nut, and means to latch the last mentioned locating means in locating position until the wrench approaches the assembling position.

8. An apparatus for assembling articles such as nuts and washers on bolts comprising a rotatable wrench, means to move the wrench into and out of assembling position, means to locate a bolt in general alignment with the wrench, an element to locate a washer relative to the bolt, a member to locate a nut on the washer, means to cause operation with the locating means, element and member in timed relation during movement of the wrench out of assembling position, and a latch to hold the last mentioned means in operated position.

9. An apparatus for assembling articles such as nuts and washers on bolts comprising a rotatable wrench, means to move the wrench into and out of assembling position, means to locate a bolt in general alignment with the wrench, an element to locate a washer relative to the bolt, a member to locate a nut on the washer, means to cause operation with the locating means, element and member in timed relation during movement of the wrench out of assembling position, a latch to hold the last mentioned means in operated position, and means movable in advance of the wrench to center the nut, washer and bolt with each other.

10. An apparatus for assembling articles such as nuts and washers on bolts comprising a rotatable wrench, means to move the wrench into and out of assembling position, means to locate a bolt in general alignment with the wrench, an element to locate a washer relative to the bolt, a member to locate a nut on the washer, means to cause operation with the locating means, element and member in timed relation during movement of the wrench out of assembling position, a latch to hold the last mentioned means in operated position, and means to align the nut with the bolt.

11. An apparatus for assembling articles such as nuts and washers on bolts comprising a rotatable wrench, means to move the wrench into and out of assembling position, means to locate a bolt in general alignment with the wrench, an element to locate a washer relative to the bolt, a member to locate a nut on the washer, means to cause operation with the locating means, element and member in timed relation during movement of the wrench out of assembling position, a latch to hold the last mentioned means in operated position, means movable in advance of the wrench to center the nut, washer and bolt with each other, and means to align the centers of the nut and bolt.

12. An apparatus for assembling articles such as nuts and washers on bolts comprising a rotatable wrench, means to move the wrench into and out of assembling position, means to locate a bolt in general alignment with the wrench, an element to locate a washer relative to the bolt, a member to locate a nut on the washer, means to cause operation with the locating means, element and member in timed relation during movement of the wrench out of assembling position, a latch to hold the last mentioned means in operated position, means movable in advance of the wrench to center the nut, washer and bolt with each other, and means to release the latch subsequent to the actuation of the centering means to release the locating means, element and member.

13. An apparatus for assembling articles such as washers and flat-sided nuts having corners on bolts, means to move a washer, a flat-sided nut with corners and a bolt into superposed positions, means to align them one with another, and a wrench recessed to receive the nut and grooved to readily receive the corners of the nut for rotating the nut on the bolt.

14. A method of assembling articles such as a nut and a washer on a bolt which method comprises feeding a washer and a nut from opposite directions into superposed positions over a bolt, passing a guide through the nut and washer and into engagement with the end of the bolt while the nut and washer are spaced from the bolt, then causing the washer to drop over the end of the bolt and the nut to drop to the bolt and rest thereon, and bringing a rotating wrench into engagement with the nut over the guide to drive the nut on the bolt.

15. A method of assembling articles such as a nut and a washer on a bolt which method comprises feeding a washer and a nut from opposite directions into superposed positions over a bolt, passing a guide through the nut and washer and into engagement with the end of the bolt while the nut and washer are spaced from the bolt, then causing the washer to drop over the end of the bolt and the nut to drop to the bolt and rest thereon, aligning the centers of the nut and bolt, and causing relative rotation of the nut and bolt to cause interengagement thereof.

16. A method of assembling articles such as a nut and a washer on a bolt which method comprises feeding a washer and nut from opposite directions into superposed positions, locating a bolt therebeneath, passing a guide through the nut and washer and into engagement with the end of the bolt while the nut and washer are spaced from the bolt, then causing the washer to drop over the end of the bolt and the nut to drop to the bolt and rest thereon, and causing relative rotation of the nut and bolt to cause interengagement thereof.

17. A method of assembling articles such as a nut and a washer on a bolt which method comprises feeding a washer and nut from opposite directions into superposed positions, locating a bolt therebeneath, holding the nut and washer spaced from the bolt, passing a guide through the nut and washer and into engagement with the end of the bolt while the nut and washer are spaced from the bolt, then causing the washer to drop concentric with the guide and come to rest concentric with the bolt and the nut to drop concentric with the guide and come to rest on the bolt, and bringing a rotating wrench into engagement with the nut over the guide to drive the nut on the bolt.

18. A method of assembling articles such as a nut and a washer on a bolt which method comprises feeding a washer and nut from opposite directions into superposed positions, locating a bolt therebeneath, holding the nut and washer spaced from the bolt, passing a guide through the nut and washer and into engagement with the end of the bolt while the nut and washer are spaced from the bolt, then causing the washer to drop concentric with the guide and come to rest concentric with the bolt and the nut to drop concentric with the guide and come to rest on the bolt, aligning the centers of the nut and bolt, and causing relative rotation of the nut and bolt to cause interengagement thereof.

19. In an apparatus for assembling articles such as nuts and washers on bolts comprising means to feed a washer and a nut from opposite directions into superposed positions over a bolt, a guide, means to pass the guide through the nut and washer and into engagement with the end of the bolt while the nut and washer are spaced from the bolt, means to cause the washer to drop over the end of the bolt and the nut to drop to the bolt and rest thereon, a rotating wrench, and means to move the wrench into engagement with the nut over the guide to drive the nut on the bolt.

20. In an apparatus for assembling articles such as nuts and washers on bolts comprising means to feed a washer and a nut from opposite directions into superposed positions over a bolt, a guide, means to pass the guide through the nut and washer and into engagement with the end of the bolt while the nut and washer are spaced from the bolt, means to cause the washer to drop over the end of the bolt and the nut to drop to the bolt and rest thereon, means to align the centers of the nut and bolt, a rotating wrench, and means to move the wrench into engagement with the nut over the guide to drive the nut on the bolt.

21. In an apparatus for assembling articles such as nuts and washers on bolts comprising means to feed a washer and a nut from opposite directions into superposed positions, means to locate a bolt therebeneath, a guide, means to pass the guide through the nut and washer and into engagement with the end of the bolt while the nut and washer are spaced from the bolt, means to cause the washer to drop over the end of the bolt and the nut to drop to the bolt and rest thereon, and means to cause relative rotation of the nut and bolt to cause interengagement thereof.

22. In an apparatus for assembling articles such as nuts and washers on bolts comprising means to feed a washer and a nut from opposite directions into superposed positions over a bolt, means to hold the nut and washer spaced from the bolt, a guide, means to actuate the holding means to cause the washer to drop concentric with the guide and come to rest concentric with the bolt and cause the nut to drop concentric with the guide and come to rest on the bolt, a rotating wrench, and means to move the wrench into engagement with the nut over the guide to drive the nut on the bolt.

23. In an apparatus for assembling articles such as nuts and washers on bolts comprising means to feed a washer and a nut from opposite directions into superposed positions, means to locate a bolt therebeneath, a guide, means to actuate the holding means to cause the washer to drop concentric with the guide and come to rest concentric with the bolt and cause the nut to drop concentric with the guide and come to rest on the bolt, means to align the centers of the nut and bolt, a rotating wrench, and means to move the wrench into engagement with the nut over the guide to drive the nut on the bolt.

24. In an apparatus for assembling articles such as nuts on bolts comprising means to locate a bolt, means to move a nut to a position above the bolt, a support for the nut thus positioned, a guide movable through the supported nut and in contact with the bolt to center the nut with the bolt, means to move the support free of the nut for movement of the nut by gravity concentric with the guide and to rest on the bolt, and means to cause relative movement of the nut and bolt to cause interengagement thereof.

25. In an apparatus for assembling articles such as nuts on bolts comprising means to locate a bolt, means to move a nut to a position above the bolt, a support for the nut thus positioned, a guide movable through the supported nut and in contact with the bolt to center the nut with the bolt, means to move the support free of the nut for movement of the nut by gravity concentric with the guide and to rest on the bolt, means to align the centers of the nut and bolt, and means to cause relative movement of the nut and bolt to cause interengagement thereof.

26. In an apparatus for assembling articles such as nuts and washers on bolts comprising a rotatable wrench movable toward and away from an assembling position, a washer locating member, a nut locating member, and mechanism actuable with movement of the wrench away from assembling position to move the said members into feeding positions to locate a nut on a washer for assembly on a bolt.

27. In an apparatus for assembling articles such as nuts and washers on bolts comprising a rotatable wrench movable toward and away from an assembling position, a washer locating member, a nut locating member, mechanism actuable with movement of the wrench away from assembling position to move the said members into feeding positions to locate a nut on a washer for assembly on a bolt, and means to latch the mechanism to hold the members in feeding position for movement of the wrench toward the assembling position.

28. In an apparatus for assembling articles such as nuts and washers on bolts comprising a rotatable wrench movable toward and away from an assembling position, a washer locating member, a nut locating member, mechanism actuable with movement of the wrench away from assembling position to move the said members into feeding positions to locate a nut on a washer for assembly on a bolt, means to latch the mechanism to hold the members in feeding position for movement of the wrench toward the assembling position, and means movable with the wrench into assembling position to release the latching means to cause freeing of the nut and washer for assembly on the bolt.

29. In an apparatus for assembling articles such as nuts and washers on bolts comprising a rotatable wrench movable toward and away from an assembling position, a washer locating member, a nut locating member, a bolt locating member, and mechanism actuable with the wrench away from the assembling position to move the said members to locate a nut, a washer and a bolt in superposed positions for assembly.

30. In an apparatus for assembling articles such as nuts and washers on bolts comprising a rotatable wrench movable toward and away from an assembling position, a washer locating member, a nut locating member, a bolt locating member, mechanism actuable with the wrench away from the assembling position to move the said members to locate a nut, a washer and a bolt in superposed positions, and means to latch the mechanism to hold the members in their superposed positions for movement of the wrench toward the assembling position.

31. In an apparatus for assembling articles such as nuts and washers on bolts comprising a rotatable wrench movable toward and away from an assembling position, a washer locating member, a nut locating member, a bolt locating member, mechanism actuable with the wrench away from the assembling position to move the said members to locate a nut, a washer and a bolt in superposed positions, means to latch the mechanism to hold the members in their superposed positions for movement of the wrench toward the assembling position, and means movable with the wrench into assembling position to release the latching means to cause freeing of the nut and washer for assembly on the bolt.

32. In an apparatus for assembling articles such as nuts and washers on bolts comprising a rotatable wrench movable toward and away from an assembling position, a washer locating member, a nut locating member, a support for a nut in advance of the nut locating member, a receptacle for a supply of nuts, mechanism actuable with movement of the wrench away from assembling position to move the said members into feeding positions to locate a nut on a washer for assembly on a bolt, and means actuated by the mechanism to eject nuts singly from the receptacle onto the support during each cycle of movement of the wrench.

EDWARD BERTALAN.
LOWELL J. MOELLER.